(12) United States Patent
Strassle et al.

(10) Patent No.: US 6,334,732 B1
(45) Date of Patent: Jan. 1, 2002

(54) CLOSING BUSHING FOR A CLAMPING DEVICE USED FOR REMOVABLY CONNECTING TWO PROFILED PARTS

(75) Inventors: Marcel Strassle; Kurt Zullig, both of Kirchberg (CH)

(73) Assignee: Syma Intercontinental AG, Kirchberg (CH)

( * ) Notice: Subject to any disclaimer, the term of this patent is extended or adjusted under 35 U.S.C. 154(b) by 0 days.

(21) Appl. No.: 09/462,874

(22) PCT Filed: Aug. 11, 1998

(86) PCT No.: PCT/CH98/00337

§ 371 Date: Mar. 10, 2000

§ 102(e) Date: Mar. 10, 2000

(87) PCT Pub. No.: WO99/09326

PCT Pub. Date: Feb. 25, 1999

(30) Foreign Application Priority Data

Aug. 12, 1997 (CH) .............................. 1900/97

(51) Int. Cl.[7] ................................. F16B 7/04
(52) U.S. Cl. .................. 403/321; 403/322.1; 403/324; 403/187
(58) Field of Search .................. 403/12, 231, 252, 403/297, 321, 322.1, 322.3, 322.4, 286, 345, 363, 381, 201, 187, 188, 382; 16/130; 52/127.9, 127.11; 411/354

(56) References Cited

U.S. PATENT DOCUMENTS

| | | | | |
|---|---|---|---|---|
| 3,331,623 A | * | 7/1967 | Baresel-Bofinger | 403/231 |
| 4,131,376 A | * | 12/1978 | Busse | 403/12 |
| 4,185,357 A | * | 1/1980 | Busse | 16/130 |
| 4,787,769 A | * | 11/1988 | Michael | 403/252 |
| 4,983,065 A | * | 1/1991 | Späth | 403/252 |
| 5,143,474 A | * | 9/1992 | Vieler | 403/252 |
| 5,209,598 A | * | 5/1993 | Züllig | 403/231 |
| 5,624,201 A | * | 4/1997 | Offenbroich | 403/231 |
| 5,772,353 A | * | 6/1998 | Grieser et al. | 403/231 |
| 6,106,183 A | * | 8/2000 | Strässle et al. | 403/252 |
| 6,148,569 A | * | 11/2000 | Giovannetti | 403/231 |

FOREIGN PATENT DOCUMENTS

| | | |
|---|---|---|
| DE | 1811743 | 6/1970 |
| DE | 26 10 200 | 9/1977 |
| DE | 28 04 222 | 8/1979 |
| EP | 599 178 | 6/1994 |
| WO | WO 97/25536 | 7/1997 |

* cited by examiner

Primary Examiner—Lynne H. Browne
Assistant Examiner—Doug Hutton
(74) Attorney, Agent, or Firm—Sughrue Mion, PLLC (57) ABSTRACT

The present invention relates to a closing bushing (7) which is intended for a clamping device (2) used for removably connecting two profiled parts (1). The clamping device (2) comprises an adjustment knob (6) in which a profiled part (1) can be locked and which can be inserted in a recess (5) formed in said profiled part (1). The closing bushing (7) is designed for the form-fitting reception of the clamping device (2) body through a recess (16), and comprises a bore in which the adjustment knob (6) can be received. The surface oriented in the introduction direction (12) of the clamping device (2) in the closing bushing (7) is larger than the corresponding surface of the adjustment knob (6). A clamping device provided with such a closing bushing (7) exhibits a greater resistance to the traction forces applied in the direction of the arrow (12). Clamping devices (2) of the above-mentioned type can also be used for profiled parts (1) made of materials different from the traditional ones, such as wooden parts.

9 Claims, 7 Drawing Sheets

CLOSING BUSHING FOR A CLAMPING DEVICE USED FOR REMOVABLY CONNECTING TWO PROFILED PARTS

The present invention relates to a device for the releasable connection of two profile pieces, having a clamping device which can be introduced into an opening provided in a profile piece, having a closure sleeve which, for receiving the body of the clamping device in a form-fitting manner, has a recess, and having an operating knob by means of which the clamping device can be secured in the closure sleeve.

Such a device is known from DE 28 04 222, in which a description is given of a connection fitting which is intended for parts of furniture and can be used to secure a clamping pin, positioned in a profile piece, by a closure sleeve, turning of the closure sleeve causing an engagement helix of the same to engage in annular grooves of the clamping pin.

A further device for the releasable connection of two or more wooden parts is known from DE 18 11 743, in the case of which a metal pin is secured in a releasable manner, as a connecting rod, in a profile piece via a closure sleeve configured as a cam plate.

The abovementioned devices are not suitable for repeated assembly and dismantling as is necessary for fair construction.

A clamping device of the type mentioned above for fair construction is known, for example, from the applicant's WO 97/25536. Such clamping devices are provided in order to connect two profile pieces to one another. These are usually constituted by a profile rod on which a wall profile is positioned. Provided laterally in the wall profile for each clamping device is an inner milled relief into which the clamping device can be pushed up to the projecting hook elements. Provided on one side of the wall surface, for a clamping device known from WO 97/25536, is a round bore through which the locking head extends once it has been sunken in the clamping device, counter to the action of a spring force, and advanced through the milled relief up to the bore into which it latches.

Also known from the prior art, in addition to the devices of the type mentioned above, are a number of further devices which all have in common the two features that they are advanced in a milled relief of the wall panel, and that an operating knob projects—for the most part flush—out of the wall panel on one side of the latter.

Said operating knob, at the same time, absorbs tensile forces which act on the wall panel and try to separate the latter from the profile strip.

It is also the case that, in addition to metal, other materials, for example wood, are being used more and more commonly as wall elements. It has been found here that the operating knob, which projects into the wall surface in the case of the known clamping devices, is not suitable for absorbing relatively large tensile forces of the type described above. The same problems arise with base panels or shelves, which are likewise being produced more and more from wood.

Taking the abovementioned prior art as departure point, the object of the invention is thus to configure devices of the type mentioned in the introduction such that they are suitable for frequent assembly and dismantling for fair construction and, at the same time, they can also be used with non-metallic materials, e.g., wood.

This object is achieved according to the invention, in the case of a device of the type mentioned in the introduction, in that the operating knob is provided in the clamping device, in that the closure sleeve has a bore which receives the operating knob, and in that the operating knob can be pushed into the body of the clamping device, counter to a spring force, in the transverse direction to the longitudinal axis of the clamping device.

Further advantageous configurations of the invention are specified in the dependent claims.

The invention is explained in more detail hereinbelow by way of example, using different exemplary embodiments, with reference to the attached drawings in which.

Figure 1:
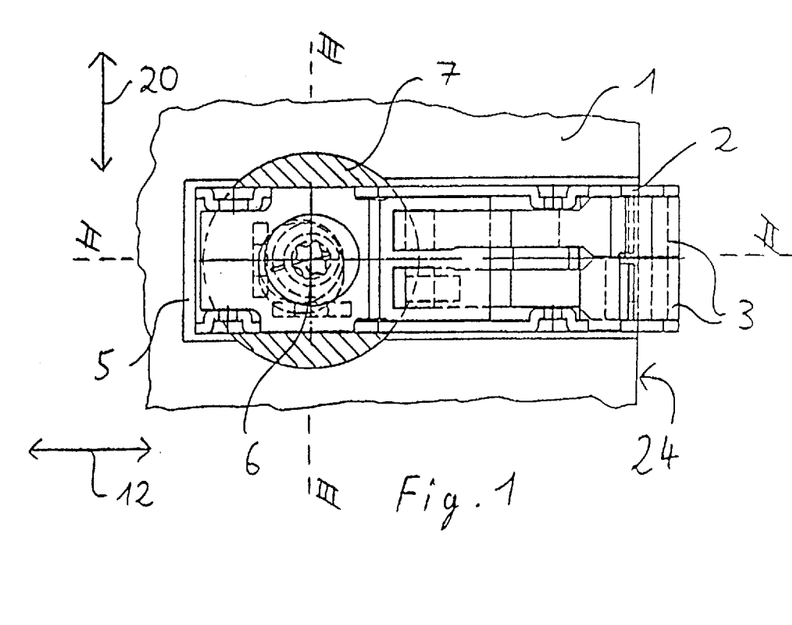
FIG. 1 shows a plan view of a clamping device, introduced into a wall panel, with a sleeve according to the invention in a first exemplary embodiment.

FIG. 1 shows a plan view of a clamping device 2 which is introduced into a wall panel 1 and of which merely the clamping hooks 3 project beyond the front wall-panel edge 24. 14 designates a profile rod in which the clamping hooks 3 can be hooked in a releasable manner. The clamping device 2 is positioned in a milled relief in the wall panel 1, said milled relief being designated 5. The construction of the clamping device 2 can be gathered from WO 97/25536. An essential feature of the clamping device 2 is the head 6 which is sunken in the body of the clamping device 2, counter to the action of a spring force, and is then introduced into the wall panel 1 through the milled relief 5. Said head 6 then projects, in a transverse bore, into the wall panel 1, and it advantageously terminates flush with the wall panel 1.

7 designates the sleeve, the functioning of which will be explained in conjunction with the rest of the drawings.

Figure 2:
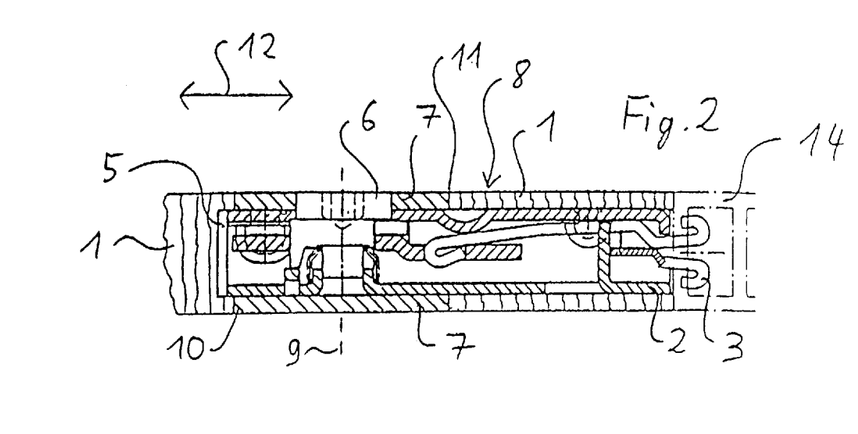
FIG. 2 shows the wall panel, clamping device and sleeve according to FIG. 1 in a cross Section along line II—II.

FIG. 2 shows a cross section along line II—II of FIG. 1, the same features having the same designations in each case. It can clearly be seen that the clamping device 2 has been advanced into the milled relief 5 and that the head 6 of the clamping device 2 terminates flush with the surface 8 of the wall panel 1, there being provided, about the axis 9, a cylindrical bore 10 into which the sleeve 7 can, be inserted before the clamping device 2 is inserted.

It can clearly be seen that the sleeve 7, in the region of the wall panel 1, is fitted in a form-fitting manner in the latter and, in particular in the regions designated 11, is capable of absorbing forces which act in one of the directions of the double arrow 12.

Figure 3:
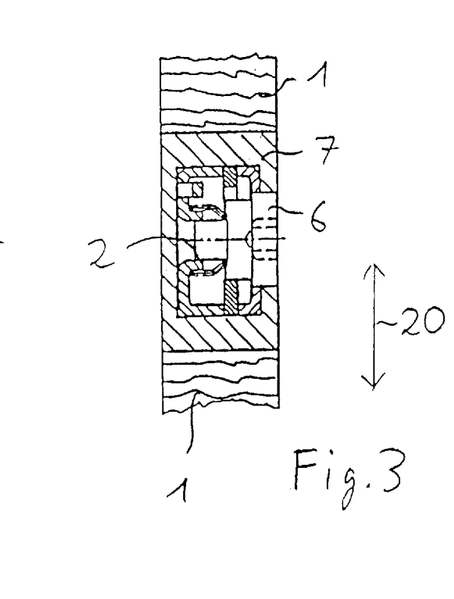
FIG. 3 shows the same elements according to FIG. 1 in a cross section along line III—III.
Figure 4:
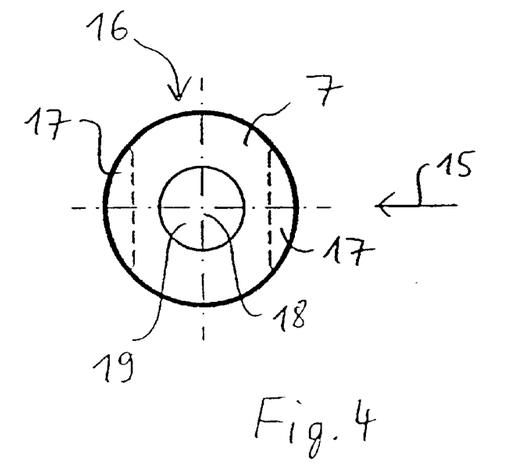
FIG. 4 shows a plan view of a sleeve as is used in the first exemplary embodiment according to FIGS. 1 to 3.
Figure 5:
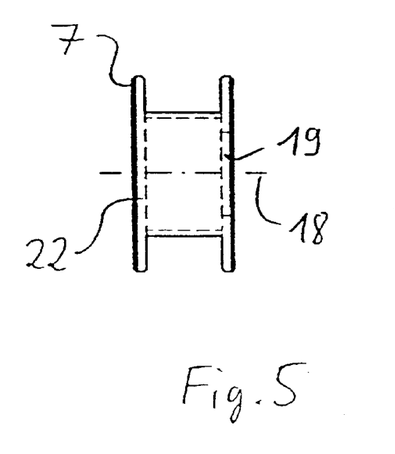
FIG. 5 shows a side view of the sleeve according to FIG. 4.

FIG. 3 illustrates a cross section along line III—III from FIG. 1. FIG. 4 shows the sleeve 7 in a plan view. This is associated with FIG. 5, which shows the same sleeve 7 in the side view from the direction 15. It can clearly be seen that the cylindrical sleeve 7 has a bore 16, in this case rectangular, which passes through it and leaves behind a circle section 17 of material on both sides in each case, as seen in plan view. The body of the clamping device 2 can be advanced through the bore 16. Provided concentrically with the axis of symmetry 18 of the cylinder of the sleeve 7 is a receiving bore 19, of which the diameter is adapted such that the head 6 of the clamping device 2 fits in an essentially form-fitting manner therein.

The functioning of the sleeve 7 can clearly be seen from the illustration thereof in conjunction with FIGS. 1 to 3. The task of absorbing forces in one of the directions of the double arrow 20 in FIG. 1 or 3 is ensured by the large side surfaces of the clamping device 2. This action of force usually corresponds to the weight of the wall panels 1, which are fastened on profile rods 14 via the clamping device 2. In addition to the wall panels 1, the sleeve according to the invention can be used for a clamping device likewise for shelves and base panels or other sheet-like elements which are to be supported, in this case in particular in fair instruction.

Using the sleeve 7 vastly increases the surface area cover which it is possible to absorb forces which act in one of the directions of the double arrow 12, i.e. essentially tensile forces which could remove the wall panel 1 from the profile rod in which the clamping hooks 3 of the clamping device 2 engage. That surface area of the sleeve 7 which is subjected to tensile stressing corresponds, in the projection in FIG. 4, to the surface area which is arranged in the plane of the arrow 15. With the design selected in the exemplary embodiment, this has thus more than doubled. In addition to this surface area, which is designated 11 in FIG. 14, there are also, and in particular, the surface areas of the circle-segment sections 17 in the lateral surface, said surface areas being designated 31. At the same time, the base surface 22 of the sleeve 7 forms an abutment which reliably prevents the head 6 tilting in the sleeve 7, or the sleeve 7 tilting in relation to the wall panel 1.

Figure 6:
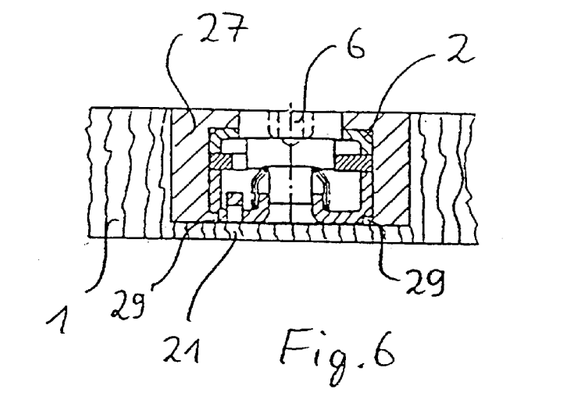
FIG. 6 shows a cross section, corresponding to FIG. 3, through a wall panel, clamping device and sleeve according to a second exemplary embodiment of the invention.
Figure 7:
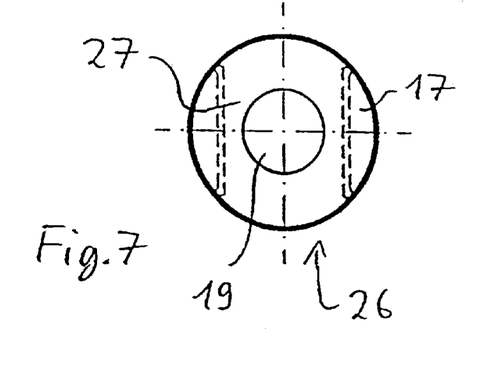
FIG. 7 shows a plan view of a sleeve according to the second exemplary embodiment, FIG. 8 a shows a side view of the sleeve according to FIG. 7.
Figure 8:
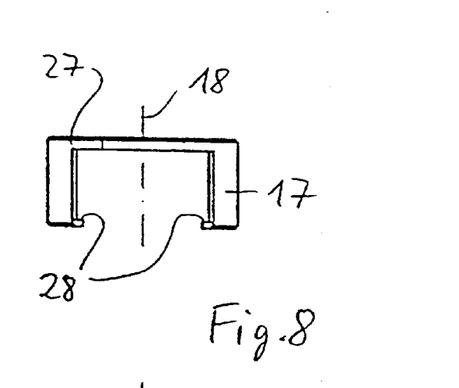

Of course, it is also possible to realize the action of the sleeve with differently configured clamping devices or sleeves. In particular, it may be desirable, as is illustrated for the second exemplary embodiment in FIG. 6, for the wall panel 1 to retain a base section 21, with the result that the sleeve 27 can only be seen in the wall panel from the top side, i.e. only from one side. As can be seen from FIGS. 7 and 8, illustrating the sleeve 27, the latter, by way of its recess 26, does not have a base plate 22, but rather has two elongate undercuts 28 which engage in grooves 29 provided correspondingly in the clamping device 2.

Figure 9:
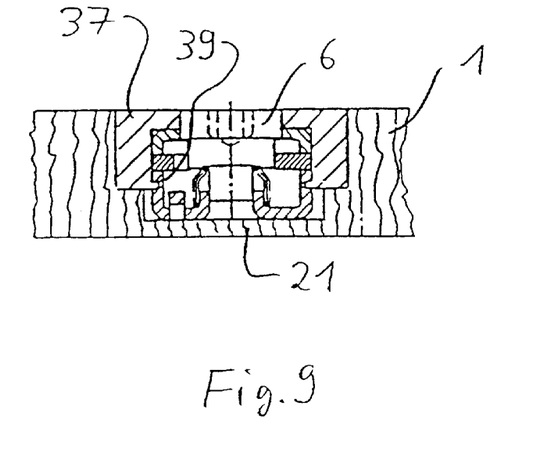
FIG. 9 shows a cross section, corresponding to FIG. 3 through a wall panel, clamping device and sleeve according to a third exemplary embodiment of the invention.
Figure 10:
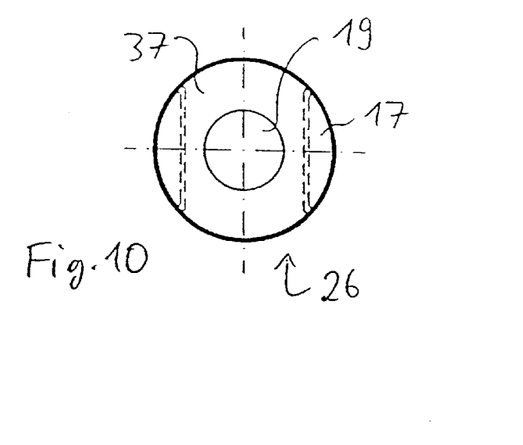
FIG. 10 shows a plan view of a sleeve according to the third exemplary embodiment.
Figure 11:
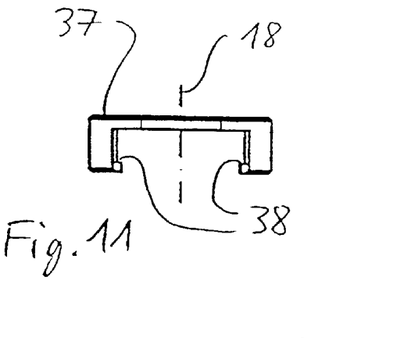
FIG. 11 shows a side view of the sleeve according to FIG. 10.

FIG. 9 shows a third exemplary embodiment of the invention, in the case of which the height of the sleeve 37 provided here has been reduced again, with the result that the undercuts 38 engage in a correspondingly provided groove 39 of the clamping device 2 approximately halfway up the latter. The bore has also been changed to a U-shape recess 26 here. It can be seen here, in FIGS. 10 and 11, that the increase in the operative surface area can also be ensured by a very low overall height of the sleeve.

Figure 12:
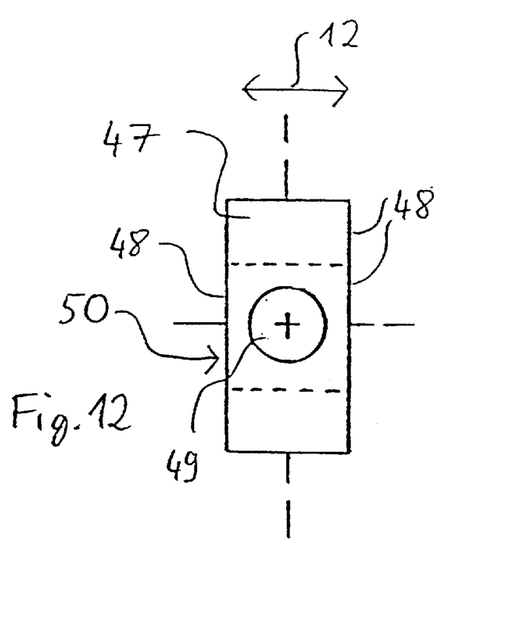
FIG. 12 shows a plan view of a sleeve according to a fourth exemplary embodiment of the invention.

In addition to the exemplary embodiments illustrated here, it is also, of course, possible for the sleeve 7, rather than being cylindrical, to have corners, in particular right angles. In addition to a rectangle, the sleeve may also have the outer form of other polygons. FIG. 12 represents a corresponding illustration in plan view. Corresponding to the first-mentioned exemplary embodiments, this sleeve 47 may be of different heights and pass through the panel 1 completely or have undercuts. The important factor in each case is that there is a front edge surface 48 of which the surface area located perpendicularly to the arrow direction 12 is greater than the diameter of the bore 49 through which the head 6 of the clamping device 2 projects. 50 designates the bore provided in the sleeve 47 for the clamping device 2. The use of the sleeve 47, of course, makes it necessary to drill a correspondingly right-angled opening in the wall panel 1. Advantageously present alongside the bore 50 are lateral beads, in this case the lateral regions 48, which absorb the tensile force originating from a profile piece 1 and direct this force, via the operating knob 6, into the clamping device 2 and then into the profile rod 14.

Of course, other forms of the head 6, for example a honeycomb structure or an octagon, are also possible. In particular, the bore 49 for the head 6 may be adapted to the requirements of this head 6, which may possibly have a different outer form, the circle form of the head 6 obviously being preferred in order to fix the clamping device 2 and the clamping hook 3 in a profile rod 1, since this form of head is thus easy to turn.

Figure 13:
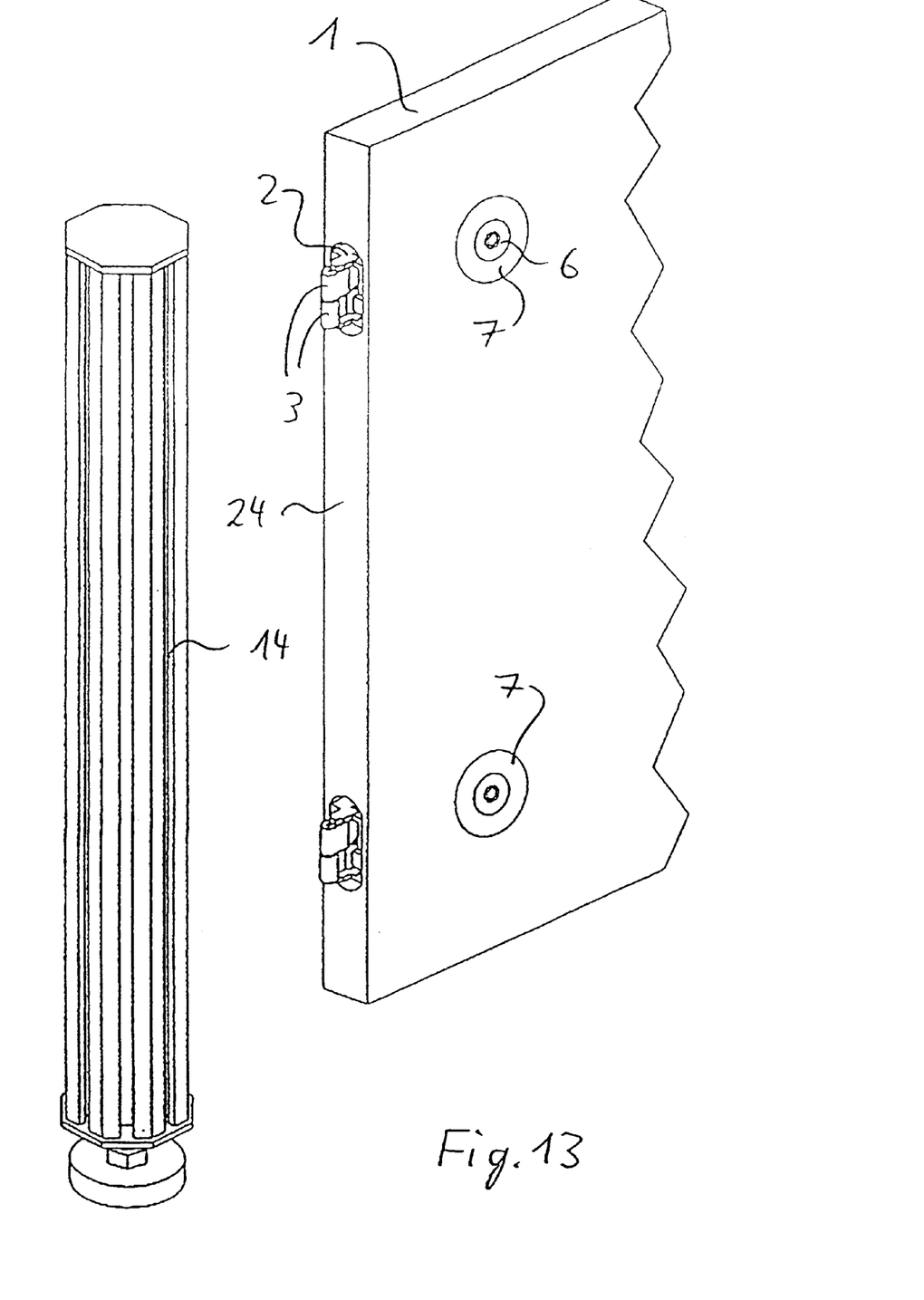
FIG. 13 shows a perspective view of a profile rod and a wall panel equipped with a sleeve according to the invention.

FIG. 13 shows a perspective view of a clamping device 2 which is equipped with a sleeve 7 according to the invention and has been pushed into a wall panel 1 before a profile rod 14. In this case, following the assembly, the front side 24 of the panel 1 rests on the profile rod 14.

Figure 14:
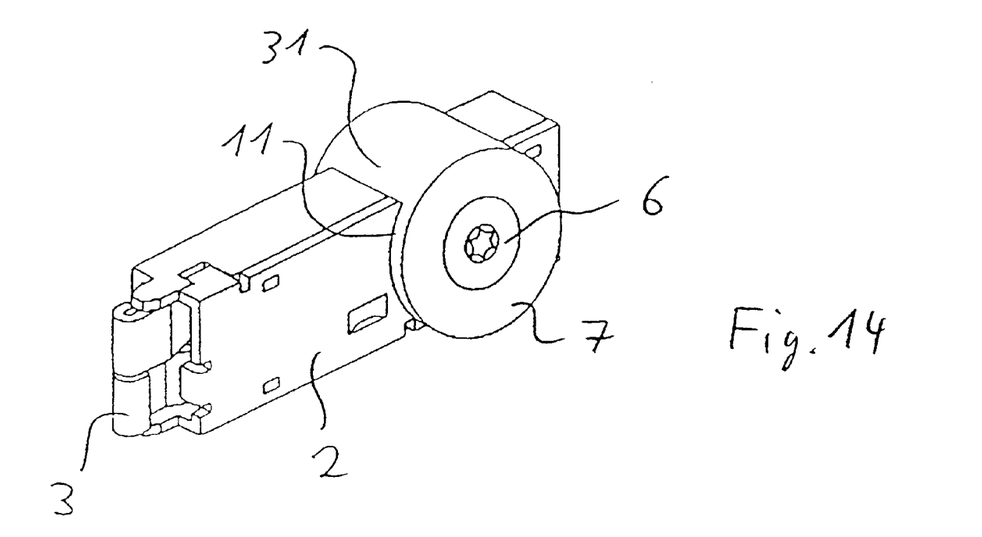
FIG. 14 shows a perspective view of the clamping device with closure sleeve according to FIGS. 1.

FIG. 14 shows a perspective view of the clamping device 2 with a closure sleeve 7 according to FIGS. 1 and 13 in the assembled state. It is possible to see, in particular, the regions 11 and 31, which project laterally beyond the clamping device 2 and thus, following the installation, rest in the material of the wall panel 1 and are suitable for absorbing forces.

Figure 15:
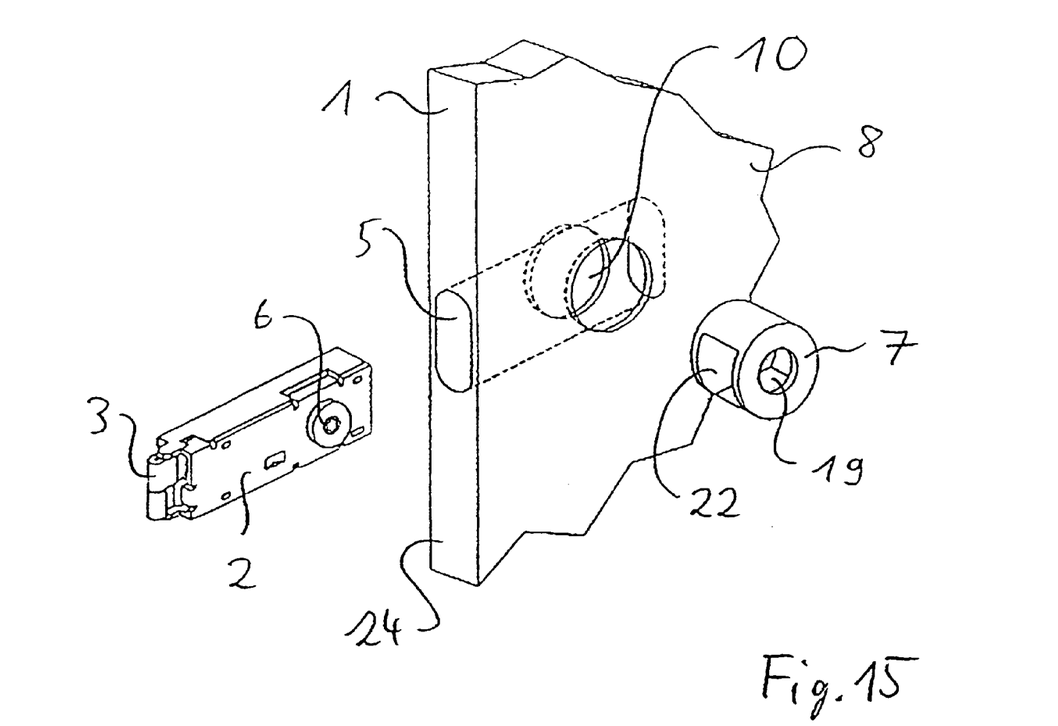
FIG. 15 shows an exploded view of the clamping device, closure sleeve and wall panel according to FIG. 1.

FIG. 15 shows an exploded view of the clamping device 2, closure sleeve 7 and wall panel 1 according to FIG. 1 before assembly. In this case, it is possible to see the through-bore 10 and the milled relief 5, into which the closure sleeve 7 and the clamping device 2 are inserted in this order. It should be noted here that the invention can be used with any clamping device which is cuboidal like the clamping device 2. It is also possible, however, for the clamping device to have, for example, a cylindrical body.

Figure 16:
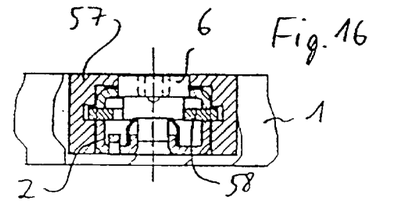
FIG. 16 shows a cross section, corresponding to FIG. 3, through a wall panel, clamping device and sleeve according to a fifth exemplary embodiment of the invention.
Figure 19:
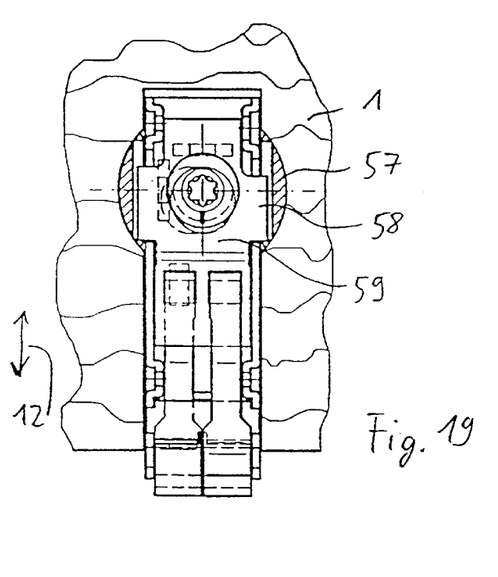
FIG. 19 shows a plan view, partially in section, of the clamping device with the sleeve according to the invention shown in FIG. 16.

FIG. 16 shows a cross section, corresponding to FIG. 3, through a wall panel 1, clamping device 2 and a sleeve 57 according to a fifth exemplary embodiment of the invention. In this case, the clamping device 2 has, laterally in each case, sections 58 which project beyond the outer border of the housing of the clamping device 2 and can better be seen in the plan view, partially in section, of the clamping device 2 according to FIG. 19. These sections 58 form a constituent part of the longitudinally movable slide 59.

Figure 17:
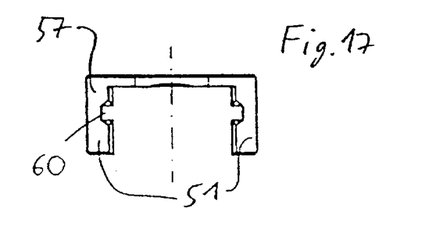
FIG. 17 shows a side view of a sleeve according to the fifth exemplary embodiment.
Figure 18:
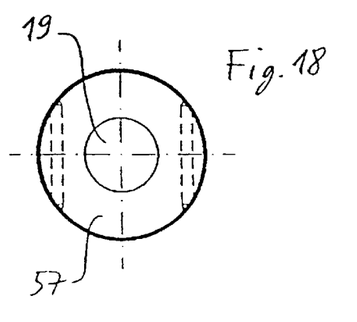
FIG. 18 shows a plan view of the sleeve according to FIG. 16.

FIG. 17 shows a side view of the sleeve 57 and FIG. 18 shows a plan view of said sleeve 57. It can be seen here that longitudinal grooves 60, which fulfil the function of the undercuts 28 and 38, are provided laterally at a corresponding height, and in a complementary manner, to the sections 58. The height of the sleeve 57 is thus preferably exactly the same as the height of the clamping device 2 with head 6. In the side view of FIG. 17, the surface, directed in the drawing-in and drawing-out directions 12 is designated 51.

Figure 20:
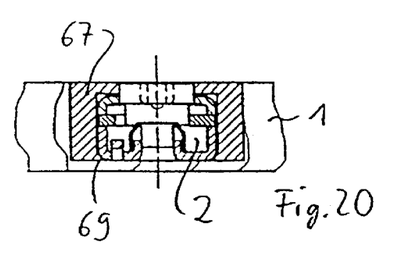
FIG. 20 shows a cross section, corresponding to FIG. 3, through a wall panel, clamping device and sleeve according to a sixth exemplary embodiment or the invention.
Figure 21:
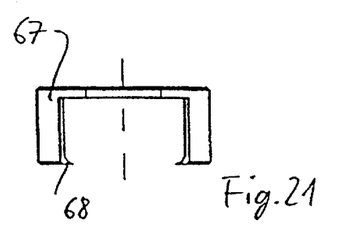
FIG. 21 shows a side view of a sleeve according to the sixth exemplary embodiment.
Figure 22:
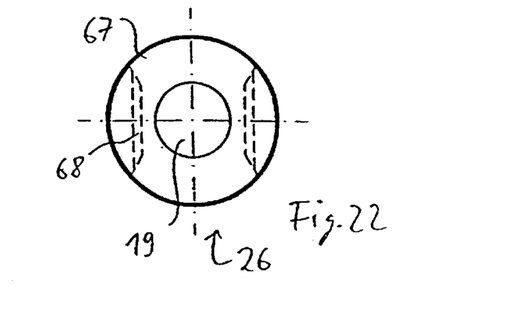
FIG. 22 shows a plan view of the sleeve according to FIG. 20.

FIG. 20 shows a cross section, corresponding to FIG. 3, through a wall panel 1, clamping device 2 and sleeve 67 according to a sixth exemplary embodiment of the invention, FIG. 21 illustrating a side view, and FIG. 22 illustrating a plan view, of the sleeve 67 according to FIG. 20. In this case, the clamping device 2 has rounded side edges and, in particular, rounded bottom side edges 69. These interact with undercuts, 68 of the sleeve 67, which have the same, complementary radius of curvature.

Figure 23:
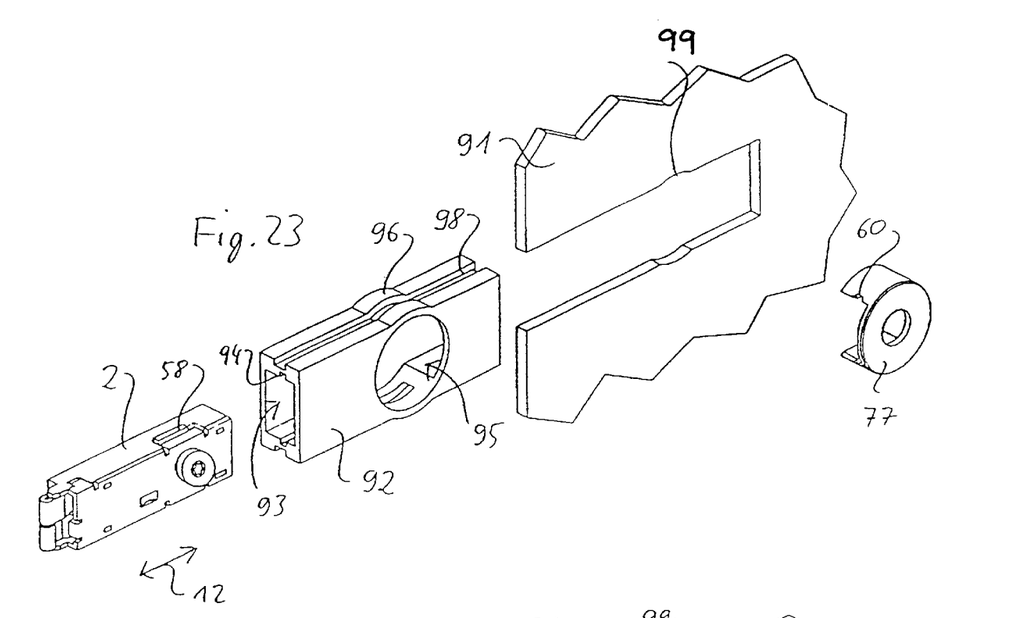
FIG. 23 shows an exploded view of a clamping device with a closure housing, a thin wall panel and a closure sleeve according to a seventh exemplary embodiment.

FIG. 23 shows an exploded view of a clamping device 2 with a closure housing 92, a thin wall panel 91 and a closure sleeve 77 according to a seventh exemplary embodiment. Like the sleeve 57, the sleeve 77 is provided with a groove 60, which interacts with projecting elements 58 of the clamping device 2. In order also to be able to use the clamping device 2 for wall panels 91 which are thinner than the clamping device 2 itself, there is provided a closure housing 92 which has a through-cavity 93 with grooves 94 for the elements 58. Also provided is an opening 95 which is arranged transversely to the direction 12 and is intended for receiving the sleeve 77. In this case, cylinder sections 96 project beyond the outer walls of the closure housing 92. Provided on the opposite sides of the closure housing 92, for receiving the thin wall panel 91, in each case is a longitudinally running groove 96, of which the complementary form is made in the wall panel 91. In this case, it is also possible to select the mass of the closure housing 92, in another embodiment, such that the circle-section-shaped recess 99 in the wall panel 91 is dispensed with.

Figure 24:
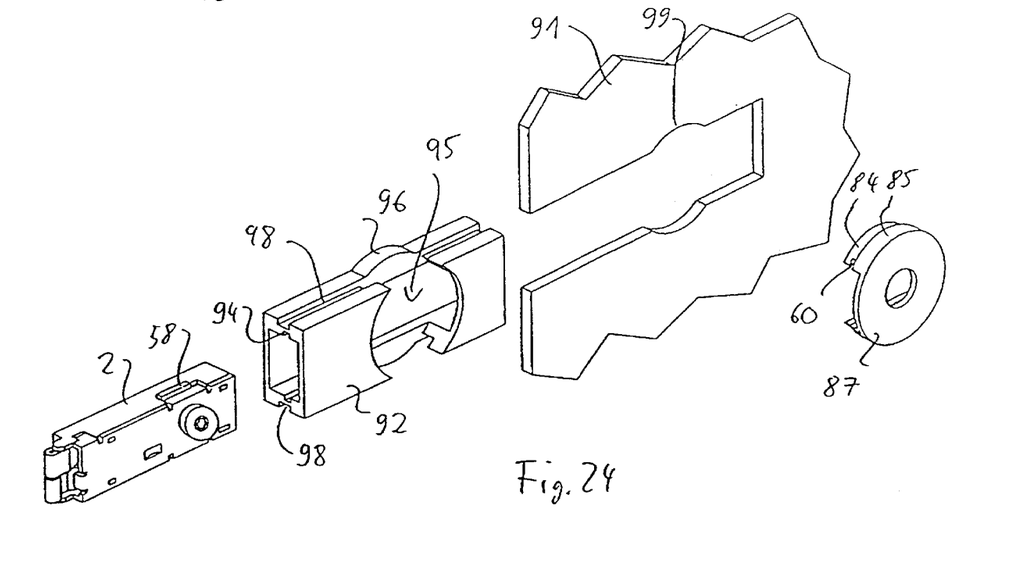
FIG. 24 shows an exploded view of a clamping device with a closure housing, a thin wall panel and a closure sleeve according to an eighth exemplary embodiment.

Finally, FIG. 24 shows an exploded view of a clamping device 2 with a further closure housing 92, a thin wall panel 91 and a closure sleeve 87 according to an eighth exemplary embodiment. This exemplary embodiment is very similar to that of FIG. 23. The differences are that the sleeve 87 has two sections 84 and 85 of different circle diameters. The rear or bottom section 84 is smaller and forms part of the surface of the groove 98. The top, larger section 85 occupies a space in the closure housing 92 which, in the closure housing 92 according to FIG. 23, was filled by said housing itself. This allows a space-saving construction of the clamping device 2 with the sleeve 87 for the thin wall panel 91.

of course, it is also possible for the sleeves 77 and 87, which are provided for use with the closure housing 92, to be configured to correspond to other embodiments and, in particular, to correspond to the sleeves 7, 27, 37, 47, 57 and 67. In this case, it is also possible, in particular, to dispense with the groove 94 if the clamping device 2 does not have any projecting sections 58.

The sleeves 7, 27, 37, 47, 57, 67, 77 and 87 and the closure housings 92 preferably consist of a light metal, e.g. aluminium. However, they may also be produced from any other material, in particular from plastic. To summarize, these sleeves have the advantage that clamping devices 2 equipped with such a closure sleeve 7, 27, 37, 47, 57, 67, 77 and 87 withstand to a considerably improved extent tensile forces acting in the longitudinal direction 12 of the clamping device 2. This means that clamping devices 2 of said type may then also be used with other materials for the profile pieces 1, e.g. wood. By using a closure housing 92, it is then also possible to use very thin profile elements 1, for example thin wooden panels 91.

We claim:

1. The prior art fails to disclose or suggest a device for the releasable connection of two profile pieces that includes: 1) a clamping device with an operating knob that secures the clamping device in the closure sleeve; and 2) a closure sleeve having a recess for receiving the clamping device; wherein the clamping device is placed in a first opening of a profile piece, and wherein the closure sleeve is introduced into a second opening in the profile piece, the second opening being perpendicular to the first opening.

2. Device according to claim 1, wherein an outer perimeter of the closure sleeve is cylindrical.

3. Device according to claim 1, wherein an outer perimeter of the closure sleeve is polygonal.

4. Device according to claim 1, wherein the recess is a bore and the closure sleeve has a base located opposite said bore.

5. Device according to claim 1, wherein the recess is configured such that, of the closure sleeve, a cross-sectionally U-shaped part remains, and wherein the closure sleeve has undercuts which interact with complementary grooves of the clamping device.

6. Device according to claim 1, wherein the closure sleeve has grooves which run laterally in the introduction direction and interact with complementary sections of the clamping device.

7. The device according to claim 1, further comprising:

a closure housing having:
  a cavity for receiving the clamping device,
  an opening, which is aligned transversely to the longitudinal direction of said clamping device and is intended for receiving the closure sleeve, and
grooves running in the longitudinal direction on narrow sides of the closure housing and intended for receiving the one profile piece.

8. The device according to claim 7, wherein the closure housing further comprises, on the narrow sides, projecting cylinder sections that interact with complementary recesses in the one profile piece.

9. The device according to claim 7, wherein, on the narrow sides of the closure housing, the cavity has mutually opposite grooves for receiving sections on the clamping device which project laterally beyond the clamping device.

* * * * *

UNITED STATES PATENT AND TRADEMARK OFFICE
CERTIFICATE OF CORRECTION

PATENT NO.      : 6,334,732 B1                                     Page 1 of 1
DATED           : January 1, 2002
INVENTOR(S)     : Marcel Strassle and Kurt Zullig It is certified that error appears in the above-identified patent and that said Letters Patent is hereby corrected as shown below:

<u>Column 6,</u>
Lines 22-30, delete "1. The prior art fails to disclose or suggest a device for the releasable connection of two profile pieces that includes: 1) a clamping device with an operating knob that secures the clamping device in the closure sleeve; and 2) a closure sleeve having a recess for receiving the clamping device; wherein the clamping device is placed in a first opening of a profile piece, and wherein the closure sleeve is introduced into a second opening in the profile piece, the second opening being perpendicular to the first opening." insert -- 1. Device for the releasable connection of two profile pieces comprising:
a clamping device; and
    a closure sleeve;
    wherein the clamping device has an operating knob that secures the clamping device in the closure sleeve;
    wherein the closure sleeve has a bore receiving the operating knob; and
    wherein the closure sleeve has a recess for receiving the clamping device in a form-fitting manner;
    wherein the clamping device is introduced into a first opening provided in one of the two profile pieces, the first opening having a first longitudinal axis;
    wherein the closure sleeve is introduced into a second opening provided in the one profile piece, the second opening having a second longitudinal axis that is perpendicular to the first longitudinal axis; and
    wherein the operating knob of the clamping device is adapted to be pushed into the clamping device, counter to a spring force, in a transverse direction to the longitudinal axis of the clamping device. --

Signed and Sealed this

Twenty-first Day of October, 2003

JAMES E. ROGAN
*Director of the United States Patent and Trademark Office*